United States Patent
Modugno et al.

(10) Patent No.: US 8,020,440 B2
(45) Date of Patent: Sep. 20, 2011

(54) SYSTEM AND METHOD FOR PROVIDING HIGH-RANGE CAPABILITY WITH CLOSED-LOOP INERTIAL SENSORS

(75) Inventors: James A. Modugno, Shakopee, MN (US); Todd A. Ell, Savage, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 365 days.

(21) Appl. No.: 12/464,927

(22) Filed: May 13, 2009

(65) Prior Publication Data

US 2009/0282916 A1    Nov. 19, 2009

Related U.S. Application Data

(60) Provisional application No. 61/127,912, filed on May 16, 2008.

(51) Int. Cl.
*G01C 19/00* (2006.01)
(52) U.S. Cl. .................................... 73/504.04; 73/504.12
(58) Field of Classification Search ........................ None
See application file for complete search history.

(56) References Cited

U.S. PATENT DOCUMENTS

| | | | | |
|---|---|---|---|---|
| 6,598,475 | B2 * | 7/2003 | Pinson | 73/504.12 |
| 6,845,670 | B1 * | 1/2005 | McNeil et al. | 73/514.32 |
| 7,091,715 | B2 * | 8/2006 | Nemirovsky et al. | 73/514.26 |
| 7,640,803 | B1 * | 1/2010 | Gutierrez et al. | 73/504.04 |
| 7,810,394 | B2 * | 10/2010 | Yazdi | 73/514.18 |
| 2003/0061878 | A1 * | 4/2003 | Pinson | 73/514.33 |
| 2008/0000296 | A1 * | 1/2008 | Johnson | 73/514.18 |
| 2008/0236280 | A1 * | 10/2008 | Johnson et al. | 73/504.14 |
| 2009/0282916 | A1 * | 11/2009 | Modugno et al. | 73/504.12 |

* cited by examiner

*Primary Examiner* — Andre Allen
(74) *Attorney, Agent, or Firm* — Scott D. Wofsy; Edwards Angell Palmer & Dodge LLP

(57) ABSTRACT

An inertial sensing system including an inertial sensor having a proof mass providing a deflection signal in response to application of an inertial force, wherein the proof mass has a physical deflection limit and a selected saturation limit set below the deflection limit, elements for providing a closed-loop output in response to the deflection signal from the inertial sensor, wherein the closed-loop output is proportional to the inertial force until the saturation limit of the inertial sensor is reached, elements for providing an open-loop output in response to the deflection signal from the inertial sensor once the saturation limit is reached, and elements for summing the closed-loop output with the open-loop output when the saturation limit of the inertial sensor is reached, to provide a high-range output response for the system.

17 Claims, 3 Drawing Sheets

US 8,020,440 B2

SYSTEM AND METHOD FOR PROVIDING HIGH-RANGE CAPABILITY WITH CLOSED-LOOP INERTIAL SENSORS

CROSS REFERENCE TO RELATED APPLICATION

This application claims priority to U.S. Provisional Patent Application No. 61/127,912, filed May 16, 2008, the entire disclosure of which is herein incorporated by reference.

BACKGROUND OF THE INVENTION

1. Field of the Invention

The subject invention is directed to inertial sensors, and more particularly, micro-electric mechanical sensors (MEMS) used for inertial guidance systems, and to a method of using inertial information stored in a proof mass of a closed-loop inertial sensor in saturation and observed as proof mass displacement, wherein the closed-loop response is added with an open-loop response to extend the range of the sensor.

2. Description of Related Art

Microelectromechanical systems (MEMS) sensors are often used in inertial guidance systems to sense the acceleration or orientation of a device, such as a spacecraft, aircraft or land based vehicle, along one, two, or three axes or directions. These sensors are typically constructed with a proof mass mounted to a substrate by way of a compliant suspension. The proof mass is sensitive to inertial forces, such that movement of the device results in displacement of the proof mass. The displacement is proportional to the amount of acceleration the device is experiencing, and is typically measured by capacitive sensor plates disposed beneath the proof mass.

In designing these sensors, the stiffness of the suspension is determined by the range of inertial force that will displace the proof mass and the electrostatic force from the capacitive sensor plates that will pull the proof mass with increasing force as displacement occurs. Ultimately, the measurement range of an inertial sensor operating in an open-loop configuration is limited so as to ensure that a "snap-down" of the proof mass will not occur. In addition, there is a trade-off between measurement sensitivity and desired range. Open loop operation provides the simplest electronics solution, with only displacement sensing required. However, the electrostatic forces produce large non-linear output.

MEMS devices that require improved linearity are typically used in a closed-loop configuration. In this implementation, the proof mass displacement is sensed as in an open-loop application, but a feedback electrostatic force is also applied to the proof mass to null out the proof mass displacement. The output of the sensor is the voltage applied to the electrodes to null the proof mass displacement. The result is improved linearity since the proof mass is only exercised with small displacements. The range of the sensor is limited to the electrode characteristic (i.e., area, gap, etc.) and the voltage available to be applied as feedback force.

While closed-loop operation has its performance advantages, under some conditions, a much higher sensing range is desired than the range that can be provided using a closed-loop configuration. The subject invention provides a system and method for providing such high range capability with a closed-loop inertial sensor, by combining the closed-loop output response of the sensor with an open-loop displacement output.

SUMMARY OF THE INVENTION

The subject invention is directed to an inertial sensing system that includes an inertial sensor having a proof mass providing a deflection signal in response to application of an inertial force. The proof mass has a physical deflection limit and a selected saturation limit that is set below the deflection limit. The system further includes means for providing a closed-loop output in response to the deflection signal from the inertial sensor, wherein the closed-loop output is proportional to the inertial force until the saturation limit of the inertial sensor is reached. The system further includes means for providing an open-loop output in response to the deflection signal from the inertial sensor once the saturation limit is reached. In addition, means are provided for summing the closed-loop output with the open-loop output when the saturation limit of the inertial sensor is reached, to provide a high-range output response for the system.

Preferably, the means for providing a closed-loop output includes a proportional-integral-derivative (PID) controller that generates a re-balancing signal used to zero the proof mass deflection. The saturation limit of the sensor corresponds to a physical limit on the electrostatic force supplied by the PID controller to re-balance the proof mass. The means for providing an open-loop output includes means for conditioning the deflection signal based upon physical deflection response characteristics of the proof mass. Preferably, the system also includes means for scaling the closed-loop output and the open-loop output to facilitate the summation of the two responses.

The subject invention is also directed to a method of inertial sensing that includes the step of providing an inertial sensor having a proof mass generating a deflection signal in response to the application of an inertial force, wherein the proof mass has a physical deflection limit and a selected saturation limit set below the deflection limit. The method also includes the step of obtaining a closed-loop output in response to the deflection signal from the inertial sensor, wherein the closed-loop output is proportional to the inertial force until the saturation limit of the inertial sensor is reached. The method further includes the steps of obtaining an open-loop output in response to the deflection signal from the inertial sensor once the saturation limit is reached, and summing the closed-loop output with the open-loop output when the saturation limit of the inertial sensor is reached, to provide a high-range output response for the system.

The subject invention is also directed to an inertial sensing system that includes an inertial sensor having a proof mass providing a deflection signal in response to application of an inertial force, a controller adapted to apply an electrostatic force to the proof mass and output a feedback signal, an analog-to-digital converter adapted to convert the deflection signal and/or the feedback signal, and output logic interfacing with the analog-to digital converter. The proof mass has a physical deflection limit and a selected saturation limit set below the deflection limit. The analog-to-digital converter is adapted to convert the feedback signal to a closed-loop output signal until the saturation limit is reached, and is adapted to convert the deflection signal to an open-loop output signal once the saturation limit is reached. The output logic is adapted to output the closed-loop output signal until the saturation limit is reached, and is adapted to output the sum of a value representing the open-loop output signal and a value representing the closed-loop output signal once the saturation limit is reached.

In one exemplary embodiment, the magnitude of the electrostatic force applied by the controller is equal to the inertial force applied to the proof mass until the saturation limit of the inertial sensor is reached. Once the saturation limit has been reached, the electrostatic force applied by the controller is a constant value. The output logic may be configured to sum the actual values of the open-loop output and closed-loop output signals received from the analog-to-digital converter. Alternatively, the output logic may be configured to sum the actual value of the open-loop output signal with a pre-determined fixed value representing the maximum value for the closed-loop output signal, which corresponds to the value of the closed-loop output signal when the saturation limit has been reached.

These and other features of the inertial sensing system and method of the subject invention will become more readily apparent to those having ordinary skill in the art from the following detailed description of the invention taken in conjunction with the several drawings described below.

BRIEF DESCRIPTION OF THE DRAWINGS

So that those skilled in the art to which the subject invention pertains will readily understand how to make and use the inertial sensing system of the subject invention without undue experimentation, preferred embodiments of the system will be described in detail below with reference to the following figures:

FIGS. 2a through 2e are illustrations of the inertial sensing system behavior in response to a ramped input signal, wherein:

FIG. 2a shows the input signal over time;

FIG. 2b shows the system output in response to the input signal over time;

FIG. 2c shows the open-loop output response to the input signal over time;

FIG. 2d shows the closed-loop output response to the input signal over time; and FIG. 2e shows the deflection of the proof mass in response to the input signal over time.

ENABLING DESCRIPTION OF THE PREFERRED EMBODIMENTS

Figure 1:
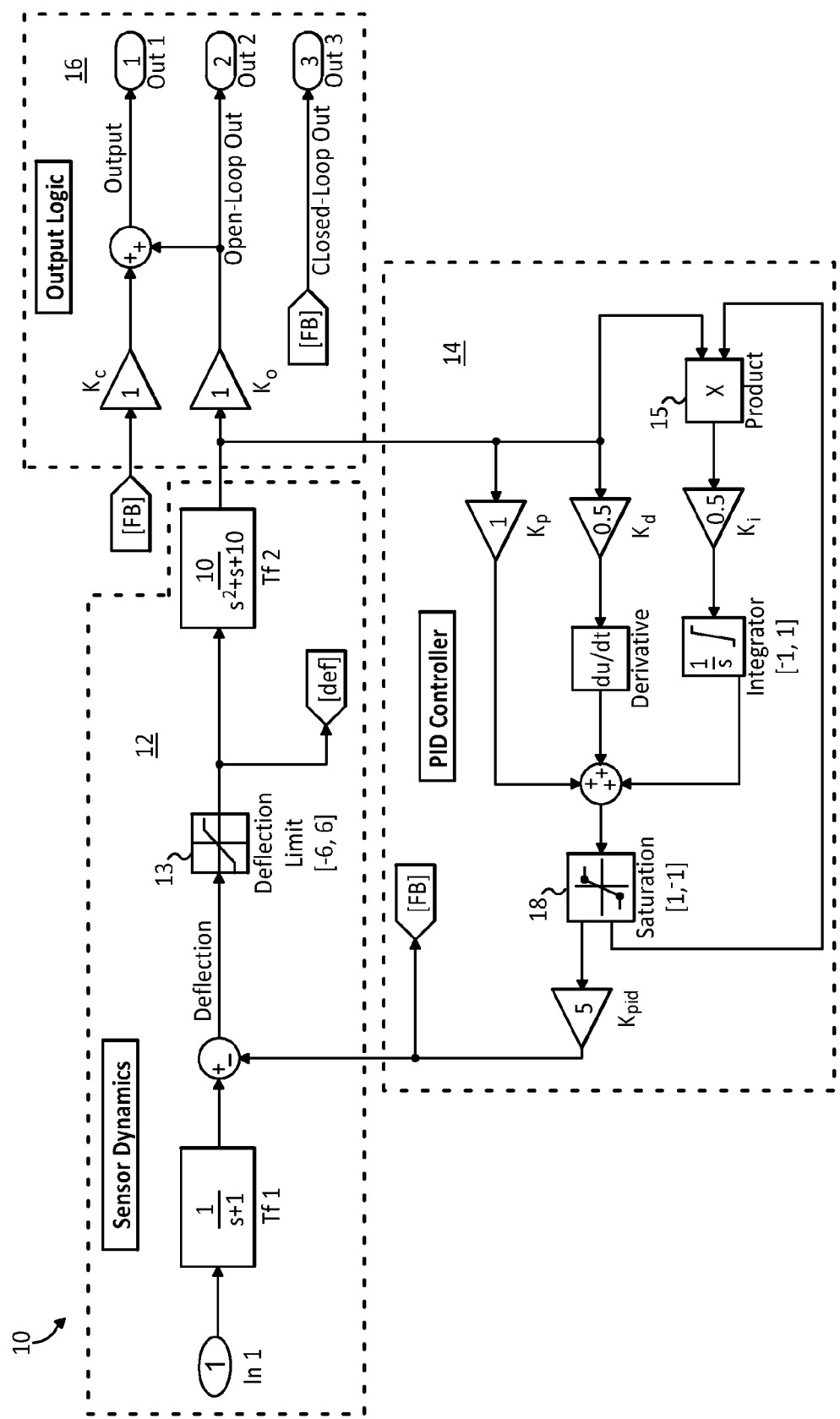
FIG. 1 is a schematic block diagram illustrating the inertial sensing system of the subject invention.

Referring now to FIG. 1, there is illustrated a block diagram of an exemplary embodiment of the combined open-loop/closed-loop sensing system 10 of the subject invention, which can be employed in conjunction with linear acceleration sensors and/or Coriolis or gyroscopic rate sensor. In general, system 10 receives an input signal, represented in FIG. 1 as In 1, resulting from the physical motion or displacement of a proof mass of an inertial sensor. It is envisioned that the input signal could represent acceleration values or angular rate values, depending upon the manner in which the inertial sensor is employed.

The system 10 further includes an open-loop motion sensor 12 having support electronics for conditioning the input signal on the inertial sensor. The support electronics include sensor dynamics in the form of transfer function blocks Tf1 and Tf2, which represent or otherwise model sensor system dynamics. For example, transfer function block Tf1 represents physical deflection response characteristics of the sensing element (e.g., how fast the proof-mass deflects in response to a step change in motion). Transfer function block Tf2 represents response characteristics of the out amplifier/conditioning electronics, such as signal damping characteristics or the like. Those skilled in the art will readily appreciate that the transfer function values are merely illustrative of system dynamics and do not represent actual system values. The sensor dynamics, and more particularly, the transfer functions Tf1 and Tf2, are configured to produce an open-loop output response to the sensor input produced by the motion of the proof mass.

In addition to the transfer functions Tf1 and Tf2, the open-loop motion sensor 12 of sensing system 10 further includes a Deflection Limit function block 13. This element of the system is used to describe the actual physical deflection limits of the proof mass associated with the MEMS sensor (i.e., where the proof mass bottoms out) or the out amplifier electronics limit, whichever is smallest. The input signal to the Deflection Limit function block 13 is a signal that represents the physical displacement of the proof mass in response to an applied motion and the re-balancing force from a proportional-integral-derivative (PID) controller, which will be discussed in more detail below.

In the disclosed exemplary embodiment, the deflection limit range of the proof mass is −6, 6. Those skilled in the art should readily appreciate that the physical limitations of any MEMS sensor and the proof mass associated with the sensor are dependent on the physical design of the sensor and the proof mass, which in turn are implementation or application driven. Thus, the physical deflection limits set forth herein are merely illustrative of an exemplary embodiment of the invention and are not intended to limit the subject invention in any manner.

The inertial sensing system 10 also includes a PID Controller designated generally by reference numeral 14, which is used as a feedback mechanism for re-balancing the proof mass during closed-loop operation. The PID controller takes the reported deflection of the proof mass as input and generates an output signal which is used to re-balance (zero) the deflection. Thus, the output signal from the PID controller represents the re-balancing electrostatic force applied to the proof mass.

In essence, the PID controller 14 is used to correct the error between the measured voltage output resulting from displacement of the proof mass and a desired set point value where the proof mass is in a balanced position. It does this by calculating and then outputting a corrective action that can re-balance the proof mass accordingly. More particularly, the PID controller performs a calculation that involves three parameters, including proportional, derivative, and integral values. The proportional value determines the reaction to the current error, the integral value determines the reaction based on the sum of recent errors and the derivative value determines the reaction rate at which the error has been changing. The weighted sum of these three actions is used to adjust the process, which, with respect to the subject invention, involves re-balancing the proof mass. In one exemplary embodiment, PID controller 14 causes an electrostatic force to be applied to the proof mass to counteract the displacement of the proof mass.

With continuing reference to FIG. 1, the inertial sensing system 10 further includes output logic designated generally by reference numeral 16. More particularly, the system 10 includes: an open-loop output branch that produces a response to the input signal designated as Out 2; a closed-loop output branch that produces a response designated as Out 3; and a system output branch that produces a response designated as Out 1 that is generated through the summation of the open loop response and the closed loop response at a summation node. Output logic 16 may be implemented using hardware, software, or a combination of both. The system output response Out 1 includes a scaled version of the closed-loop output response Out 3 (i.e., a scaled version of the re-balance or feedback signal FB) adjusted by gain $K_c$, as shown in the output logic section of FIG. 1. The open-loop output response Out 2 is adjusted by gain $K_o$ before it is added to the closed-loop output response to generate the system output response Out 1. The gains $K_c$ and $K_o$ scale the closed-loop and open-loop signals to the same unit of measure so these values can be summed together to obtain the system output response Out 1.

The PID controller 14 provides an output value gained by $K_{pid}$. The PID output value is obtained by contributions from the proportional term, which is a constant value adjusted by a proportional gain $K_p$, the derivative term generated by a differentiator and adjusted by a derivative gain $K_d$, and the integral term generated by an integrator and adjusted by an integral gain $K_i$. During operation, if the gain $K_{pid}$ is zero, the system behaves as an open-loop sensor. In contrast, if the gain $K_{pid}$ is a non-zero value, the PID controller is configured to maintain the deflection of the proof mass at zero, as in a closed-loop sensor configuration, and provides re-balance signal FB. The re-balance signal is added with the input signal at a summation node and tested by the Deflection Limit function.

During operation, the output value from the PID controller is fed to a Saturation Control block 18, prior to being gained by $K_{pid}$. The Saturation Control block 18 represents the physical limit to electrostatic force supplied by the PID controller. This limit must be reached before the deflection limit of the inertial sensor is reached. Thus, the Saturation Control block 18 is configured to disable the input to the integrator of the PID controller when the output value from the PID controller indicates that the saturation limit of the system has been reached. That is, when the inertial sensor goes into saturation (i.e., when the closed-loop maximum is reached) the integrator of the PID controller is held at its current value. This is akin to holding a constant charge on a capacitor. It avoids integrator "wind-up," where the deflection error would undesirably saturate the integrator while operating outside the closed-loop range.

Normally, the PID controller has a limited authority to re-balance the deflection of the proof mass. To control the authority limit, the saturation is used to set the limit below the actual physical deflection limit of the proof mass, which in this case is 6, −6. The saturation limit is defined in the exemplary system as 1, −1. Therefore, closed-loop saturation will occur below the physical deflection limit of the proof mass, and preferably as the input value from the sensor approaches 5, −5. This will ensure that the PID controller is no longer trying to respond to deflections beyond its control.

The output signal from the Saturation Control block 18 represents the limit status of the sensor. In terms of the exemplary embodiment, the Saturation Control block 18 outputs 0 when the saturation limit is reached and 1 when the saturation limit is not reached. This is done so that the subsequent Product block 15 can zero the PID integrator input when the saturation limit is reached. That is, the output of the Product block 15 will be zero, hence the integrator output is fixed at the value obtained when the limit is reached. Those skilled in the art will readily appreciate that features of the subject invention, such as saturation control and the limits associated therewith, can be implemented in a variety of different ways to achieve the intended result.

As noted above, the saturation control block 18 is configured to hold the integrator of the PID controller constant when the inertial sensor goes into saturation during closed-loop operation. At this point, the PID controller is simply holding the re-balancing force at its maximum. An additional input signal, resulting for example from an inertial input or sudden acceleration greater than the closed-loop capability of the system, will generate an open-loop response, which will be adjusted by gain $K_o$ and added to the closed-loop response at a summation node, generating the system output response Out 1.

Figure 2A:
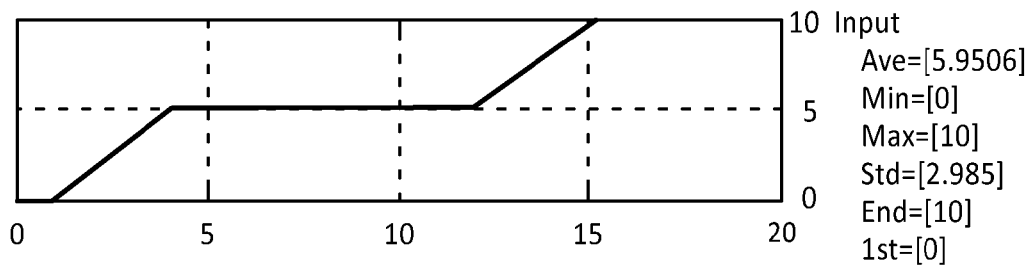
Figure 2B:
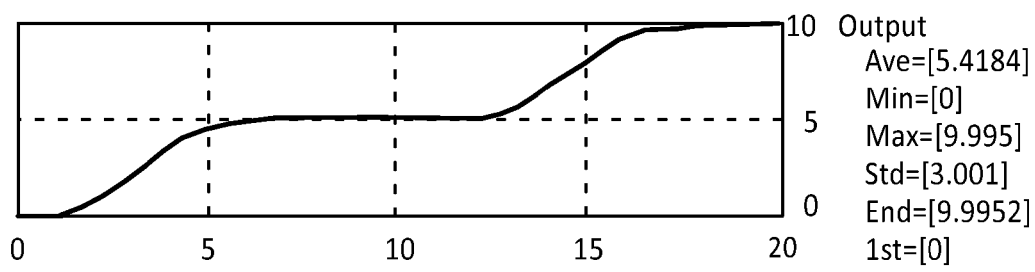
Figure 2C:
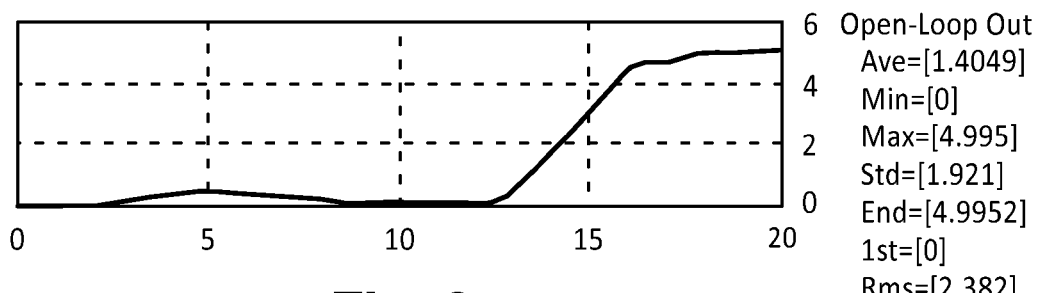
Figure 2D:
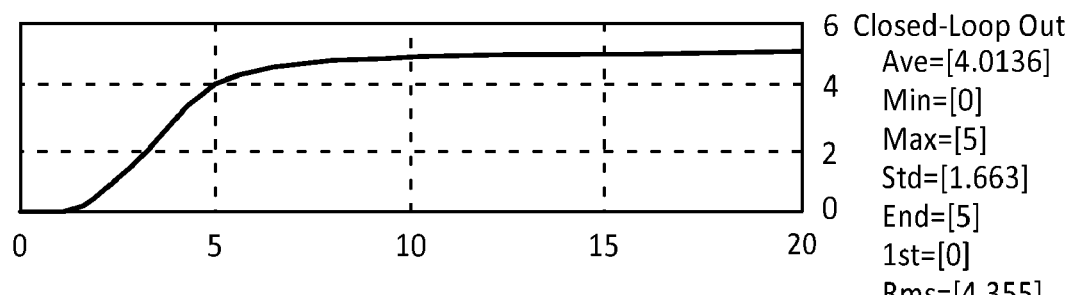
Figure 2E:
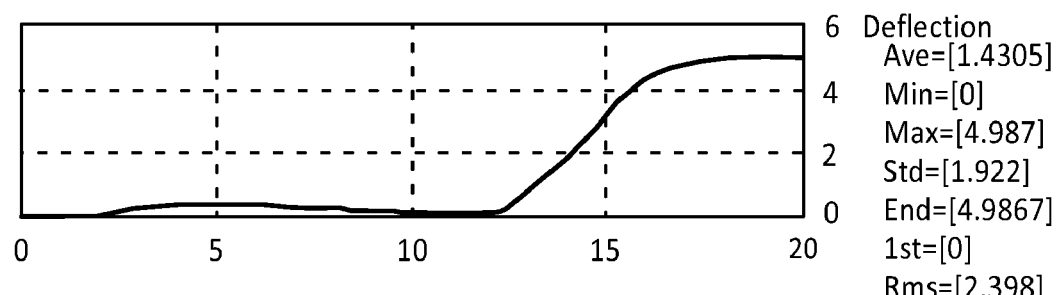

The behavior of the inertial sensing system 10 of the subject invention with respect to a ramped input signal is illustrated in FIGS. 2a-2e. As shown in FIG. 2a, the input signal ramps from 0 to 5, holds at 5 for a period of time, and then ramps to 10. The system output Out 1 generated in response to the ramped input signal is shown in FIG. 2b. As noted above, the system output shown in FIG. 2b is a summation of the open-loop output shown in FIG. 2c and the closed-loop output shown in FIG. 2d. Regarding the open-loop output, once the PID saturation limit is reached, the PID controller can no longer zero the deflection of the proof-mass, so increasing input motion causes this signal to increase proportionately, as shown in FIG. 2c. Regarding the open-loop output, until the PID saturation limit is reached, this response signal is proportional to the input motion of the inertial sensor. This is achieved by zeroing (i.e., re-balancing) the deflection.

Furthermore, when the input value is below the saturated feedback limit, the proof mass deflection is forced to zero, which is inherent in a closed-loop design. This is shown by comparing the input signal in FIG. 2a to the deflection values shown in FIG. 2e. When the input signal rises above the saturated feedback limit, the proof mass deflection increases from the null value in proportion to the additional input signal. Here the deflection maximum approaches 5. Again, this is shown by comparing the input signal in FIG. 2a to the deflection values shown in FIG. 2e. That is, when the inertial sensor goes into saturation (i.e., when the closed-loop maximum is reached), the open-loop functionality architecture provides additional information about the inertial forces affecting the proof mass. This additional information is shown by the open-loop output response in FIG. 2c, and can be readily compared to the closed-loop output response shown in FIG. 2d.

It should be noted that the open-loop and closed-loop summation can be done after the analog-to-digital conversion in software. In this case either two separate analog-to-digital converters can be used, or the saturation feedback signal can be used to determine which signal to convert. In saturation only, the open-loop output needs to be converted and the (feedback) closed-loop output is known to be at its maximum. A consequence of this approach is that the resolution of the result is doubled.

While the inertial sensing system of the subject invention has been shown and described with reference to preferred embodiments, those skilled in the art will readily appreciate that various changes and/or modifications may be made thereto without departing from the scope of the invention as described in the appended claims and their equivalents.

What is claimed is:

1. An inertial sensing system comprising:
  a) an inertial sensor having a proof mass providing a deflection signal in response to application of an inertial force, wherein the proof mass has a physical deflection limit and a selected saturation limit set below the deflection limit;
  b) means for providing a closed-loop output in response to the deflection signal from the inertial sensor, wherein the closed-loop output is proportional to the inertial force until the saturation limit of the inertial sensor is reached;
  c) means for providing an open-loop output in response to the deflection signal from the inertial sensor once the saturation limit is reached; and d) means for summing the closed-loop output with the open-loop output when the saturation limit of the inertial sensor is reached, to provide a high-range output response for the system.

2. An inertial sensing system as recited in claim 1, wherein the means for providing a closed-loop output includes a PID controller providing a re-balancing signal used to zero proof mass deflection.

3. An inertial sensing system as recited in claim 2, wherein the saturation limit corresponds to a physical limit on electrostatic force supplied by the PID controller.

4. An inertial sensing system as recited in claim 1, wherein the means for providing an open-loop output includes means for conditioning the deflection signal based upon physical deflection response characteristics of the proof mass.

5. An inertial sensing system as recited in claim 1, further comprising means for scaling the closed-loop output and the open-loop output to facilitate the summation thereof.

6. A method of inertial sensing comprising the steps of:
a) providing an inertial sensor having a proof mass generating a deflection signal in response to the application of an inertial force, wherein the proof mass has a physical deflection limit and a selected saturation limit set below the deflection limit;
b) obtaining a closed-loop output in response to the deflection signal from the inertial sensor, wherein the closed-loop output is proportional to the inertial force until the saturation limit of the inertial sensor is reached;
c) obtaining an open-loop output in response to the deflection signal from the inertial sensor once the saturation limit is reached; and
d) summing the closed-loop output with the open-loop output when the saturation limit of the inertial sensor is reached, to provide a high-range output response for the system.

7. A method according to claim 6, wherein the step of obtaining a closed-loop output includes the step of obtaining a re-balancing signal to zero proof mass deflection.

8. A method according to claim 6, wherein the step of obtaining an open-loop output includes the step of conditioning the deflection signal based upon physical deflection response characteristics of the proof mass.

9. A method according to claim 6, further comprising the step of scaling the closed-loop output and the open-loop output to facilitate the summation thereof.

10. An inertial sensing system comprising:
a) an inertial sensor having a proof mass providing a deflection signal in response to application of an inertial force, wherein the proof mass has a physical deflection limit and a selected saturation limit set below the deflection limit;
b) a controller adapted to apply an electrostatic force to the proof mass and output a feedback signal;
c) an analog-to-digital converter adapted to convert the feedback signal to a closed-loop output signal until the saturation limit is reached, and adapted to convert the deflection signal to an open-loop output signal once the saturation limit is reached; and
d) output logic interfacing with the analog-to-digital converter, wherein the output logic is adapted to output the closed-loop output signal until the saturation limit is reached, and wherein the output logic is adapted to output the sum of a value representing the open-loop output signal and a value representing the closed-loop output signal once the saturation limit is reached.

11. An inertial sensing system as recited in claim 10, wherein the magnitude of the electrostatic force applied to the proof mass by the controller is equal to the inertial force applied to the proof mass until the saturation limit of the inertial sensor is reached, and wherein the magnitude of the electrostatic force applied by the controller is a constant value once the saturation limit of the inertial sensor has been reached.

12. An inertial sensing system as recited in claim 10, wherein the value representing the closed-loop output signal is received directly from the analog-to-digital converter.

13. An inertial sensing system as recited in claim 10, wherein the value representing the closed-loop output signal is a pre-determined maximum value.

14. An inertial sensing system as recited in claim 10, wherein the controller is a PID controller.

15. An inertial sensing system as recited in claim 10, wherein the saturation limit corresponds to a physical limit on electrostatic force supplied by the controller.

16. An inertial sensing system as recited in claim 10, wherein the deflection signal is proportional to the physical deflection of the proof mass.

17. An inertial sensing system as recited in claim 10, wherein the output logic is further adapted to scale the value representing the closed-loop output signal and the value representing the open-loop output signal prior to the summation thereof.

* * * * *